United States Patent [19]

Wang

[11] 3,974,121
[45] Aug. 10, 1976

[54] BRANCHED NITROPOLYPHENYLENES AND COMPOSITIONS THEREFROM

[75] Inventor: Chen-Shen Wang, Naperville, Ill.

[73] Assignee: Standard Oil Company (Indiana), Chicago, Ill.

[22] Filed: Nov. 25, 1975

[21] Appl. No.: 635,034

Related U.S. Application Data

[63] Continuation-in-part of Ser. No. 529,855, Dec. 5, 1974, abandoned.

[52] U.S. Cl. ............................ 260/37 R; 260/2 H; 260/668 R; 260/823

[51] Int. Cl.² .................................... C08L 65/02
[58] Field of Search ............ 260/37 R, 2 H, 668 R Primary Examiner—Lewis T. Jacobs
Attorney, Agent, or Firm—Wallace L. Oliver; Arthur G. Gilkes; William T. McClain

[57] ABSTRACT

Branched nitropolyphenylene resins are disclosed which have a substantial degree of branching. Also disclosed is a polyphenylene resin mixture comprising branched nitropolyphenylenes and branched soluble polyphenylenes. This resin mixture is used to prepare asbestos, glass, carbon and graphite fiber composites.

20 Claims, 3 Drawing Figures

BRANCHED NITROPOLYPHENYLENES AND COMPOSITIONS THEREFROM

CROSS REFERENCE TO RELATED APPLICATIONS

This is a continuation-in-part of the application Ser. No. 529,855 filed Dec. 5, 1974, and now abandoned.

BACKGROUND OF THE INVENTION

This invention relates to branched nitropolyphenylenes, branched polyphenylenes and mixtures thereof and to composites made therefrom.

Much effort has been expended on the synthesis and evaluation of polymers for high temperature use. The goal has been to extend the useful upper temperature limit at which polymers maintain their desirable properties to at least 300°C and preferably to 500°C or above. Among the polymers which have been evaluated for use in this high temperature range are polyphenylenes. These polymers are composed essentially of carbon and hydrogen in aromatic ring type structures, with the rings chemically linked to each other through the ortho, meta and para positions. Such polymers are to be clearly distinguished from other chemically similar phenylene type structures, such as polyphenylene oxide, polyphenylene sulfone and other polymers containing the designation "phenylene."

Polyphenylenes generally have been produced by techniques such as acid catalyzed oxidative coupling of the benzene ring in various aromatic compounds. The polyphenylenes produced by these processes possess some degree of high temperature thermal stability, but they are generally linear (para-polyphenylene) polymers which are relatively insoluble and infusible. Polyphenylenes have been produced which do possess certain limited solubility, but these have generally been at number average molecular weights of only about 1,000 to 2,000. Generally, these low molecular weight polyphenylenes contain only a low degree of branching, that is, they are still relatively linear polymers which contain long linear segments.

Recently, Wennerberg and Wang in U.S. Pat. No. 3,792,099, incorporated by reference herein, disclosed novel branched polyphenylenes which possessed increased solubility and excellent thermal stability over a number average molecular weight range from about 1,000 to over 10,000. These highly branched polyphenylene resins can be produced by the process described in U.S. Pat. Nos. 3,855,332, 3,829,518 and 3,798,281, all incorporated by reference herein. Branched polyphenylenes of this type can be used in a number of high temperature resistant composite applications. However, these unmodified branched polyphenylenes cannot directly be used to make composites with glass, carbon or graphite fibers. Attempts to mold composites of this kind end in failure, usually due to delamination of the structure caused by insufficient bonding or interaction between the polyphenylene resin and the fiber.

It has now been discovered that, when the branched polyphenylene resin is mixed with the branched nitropolyphenylene resin described herein, composites having good structural integrity and strength can be obtained with glass, carbon and graphite fibers. It has also been discovered that a polyphenylene resin mixture containing both a branched nitropolyphenylene resin and a branched polyphenylene resin produces asbestos fiber composites having better mechanical strength after thermal aging than asbestos composites prepared with relatively low molecular weight branched polyphenylene alone.

SUMMARY OF THE INVENTION

This invention relates to branched nitropolyphenylenes which comprise benzene ring structures bonded into a polymer chain and at least 0.25 percent by weight of nitrogen. These branched nitropolyphenylenes are further characterized by the relative amounts of linear infrared absorption spectrum integrated peak area falling within certain frequency ranges within the frequency range 726–930 cm$^{-1}$. In particular, at least 8% of the integrated peak area within the frequency range 726–930 cm$^{-1}$ must fall within the frequency range 865–930 cm$^{-1}$.

This invention also relates to a unique polyphenylene resin mixture which comprises the branched nitropolyphenylene described herein and certain soluble branched polyphenylenes.

This invention further relates to composite structures containing the polyphenylene resin mixture of this invention. In particular, this invention relates to high temperature resistant composites which comprise the unique polyphenylene resin mixture and either carbon fibers, graphite fibers, glass fibers or asbestos fibers.

BRIEF DESCRIPTION OF THE INVENTION

The branched nitropolyphenylene of this invention comprises a polymer chain of benzene ring structures bonded to each other through normal single bonding at the various carbon atoms on the ring structure. The polymer chain contains mono-, di-, and trisubstituted benzene ring structures, that is, benzene ring structures that are attached to one, two, or three other benzene ring structures. In addition, it is possible that a small amount of tetra or higher substituted benzene ring structures may be present in the polymer chain, although factors such as steric hindrance indicate that the amount of such structures present is minor. As indicated above, at least some of the benzene ring structures in the polymer chain are connected or bonded to three or more other benzene ring structures. Preferably, the polymer chain contains both para and meta disubstituted benzene ring structures. This type of structure leads to enhanced solubility and ease of fabrication.

The branched nitropolyphenylenes of this invention also contain at least 0.25 percent by weight of nitrogen and at least about 0.58 percent by weight of oxygen. The nitropolyphenylenes exhibit infrared absorbance at both 1,345 cm$^{-1}$ and 1,525 cm$^{-1}$ which indicate the presence of nitro groups.

Figure 1:
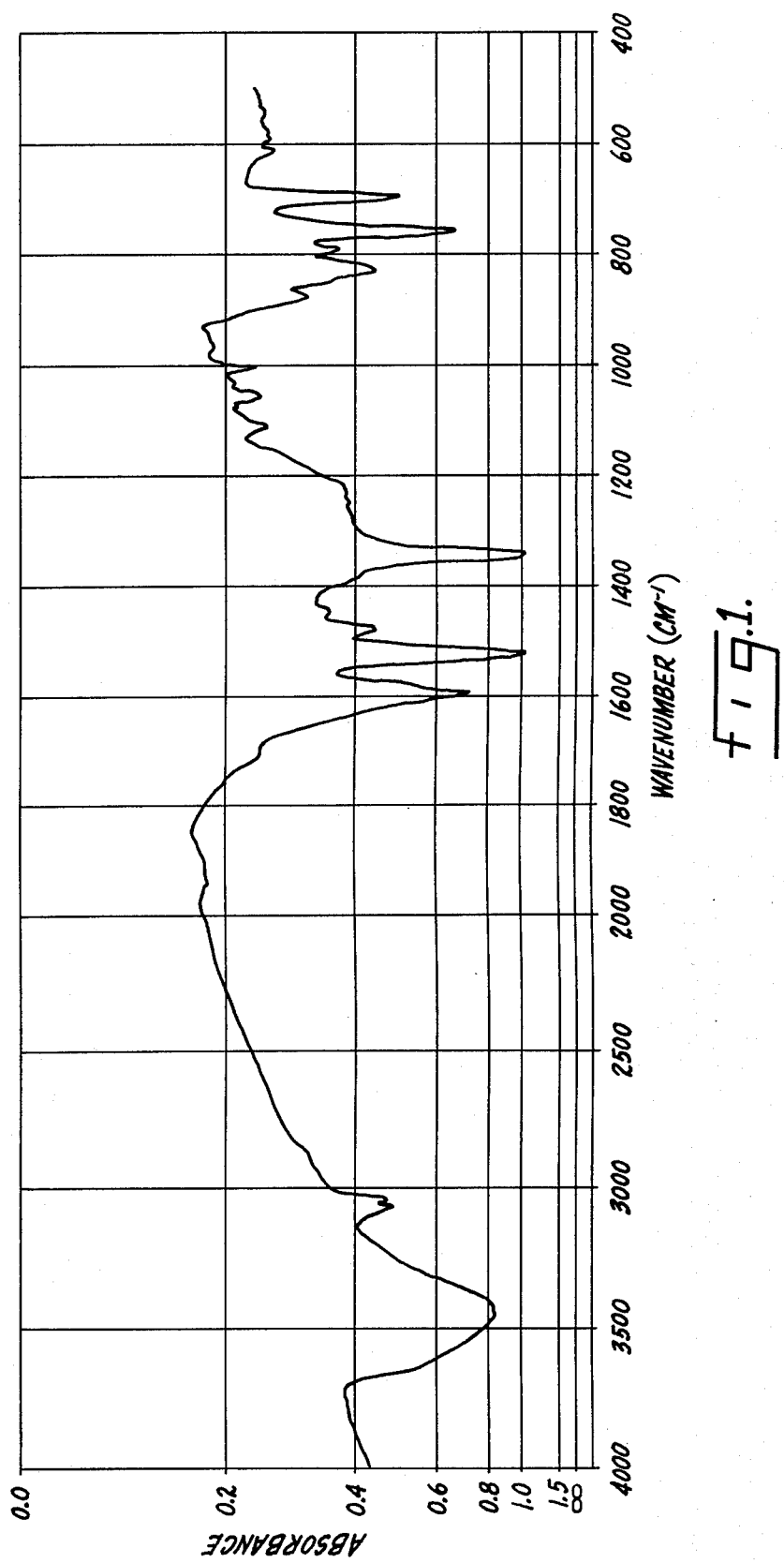
FIG. 1 shows an infrared spectrum (KBr pellet, calibrated in wavenumbers) of the branched nitropolyphenylene described in Example II.

Preferably, the branched nitropolyphenylene will have a softening point between 150°C and 350°C, and will contain at least 0.5 percent nitrogen, at least 1.15 percent oxygen, no more than about 15 percent nitrogen and about 35 percent oxygen. More preferably, the amount of nitrogen contained in the polymer will be from 0.75 percent to 5 percent. A preferred branched nitropolyphenylene of this invention exhibits an infrared absorption spectrum similar to that shown in FIG. 1. The spectrum shown in FIG. 1 was obtained from a KBr pellet containing the branched nitropolyphenylene on a Perkin-Elmer Model 180 infrared spectrometer using standard techniques. The exact spectrum shown in FIG. 1 is for the nitropolyphenylene described in Example II.

One type of unmodified branched polyphenylene from which the branched nitropolyphenylene of this invention can be made was described in U.S. Pat. No. 3,792,099. In that patent, the unmodified branched polyphenylene was characterized by its response to infrared in the region 600 $cm^{-1}$ to 1,000 $cm^{-1}$, the region in which aromatic hydrogen absorption is observed. As the unmodified polyphenylene was a pure hydrocarbon, the analysis was not influenced by the presence of substituent groups such as the nitro groups present on the polymer of this invention. On the other hand, in the branched nitropolyphenylene of this invention, the infrared absorption in the region 600 $cm^{-1}$ to 1,000 $cm^{-1}$ associated with aromatic hydrogen is influenced by the replacement of some of the aromatic hydrogens by nitro groups. Accordingly the complete analysis and characterization set forth in U.S. Pat. No. 3,792,099 cannot be carried out with the same degree of reliability for the branched nitropolyphenylene described and claimed herein.

However, linear infrared absorption spectra can be obtained between 600 $cm^{-1}$ and 1,000 $cm^{-1}$ and the integrated peak areas within the spectral band region 726 $cm^{-1}$ to 930 $cm^{-1}$ can be measured with a planimeter. The relative amounts of integrated peak areas within various subregions within the frequency region 726 $cm^{-1}$ to 930 $cm^{-1}$ is a means of further characterizing our polymer.

The absorption frequency regions within the broader frequency region from 726 $cm^{-1}$ to 930 $cm^{-1}$ and their significance are as follows: The absorption frequency region from 865 $cm^{-1}$ to 930 $cm^{-1}$ (I region) is generally characteristic of isolated aromatic hydrogen. Isolated aromatic hydrogen exists on meta-disbustituted benzene ring structures, meta-trisubstituted benzene ring structures and on benzene ring structures that have four and five substitutions. The absorption frequency region from 806 $cm^{-1}$ to 864 $cm^{-1}$ (P region) is generally characteristic of two adjacent aromatic hydrogens. Two adjacent aromatic hydrogens exist on para-disubstituted benzene ring structures. Phenyl-type benzene ring structures with a para nitro substitution and meta-disubstituted benzene ring structures in the polymer chain which also have a nitro substitution ortho to one of the benzene ring-benzene ring substitutions will exhibit absorption in this region. Because of the nitro substitutions, the boundary between the I region and the P region shifts from where it would be for a pure hydrocarbon, i.e., it shifts from 853–854 $cm^{-1}$ to 864–865 $cm^{-1}$. The region from 778 $cm^{-1}$ to 805 $cm^{-1}$ (M region) is generally characteristic of three adjacent aromatic hydrogens. Three adjacent aromatic hydrogens are found on meta-disubstituted benzene ring structures. Meta-disubstituted benzene ring structures in the polymer chain which also have a nitro group will not exhibit absorption in this region. The absorption frequency region from 726 $cm^{-1}$ to 777 $cm^{-1}$ (PH region) is generally characteristic of five adjacent aromatic hydrogens, i.e., a phenyl-type structure. However, structures of this type which are bound into the polymer chain by only one carbon to carbon bond and which also contain a nitro group will not exhibit absorption in this region, but in one of the other regions described above.

Using the integrated peak area obtained from linear infrared absorption spectra for the region from about 600 $cm^{-1}$ to 1000 $cm^{-1}$, it has been determined that the branched nitropolyphenylene of this invention must have at least 8 percent of the linear infrared absorbance spectrum integrated peak area in the frequency range 726–930 $cm^{-1}$ within the I frequency range 865–930 $cm^{-1}$. It is this type of absorption which is indicative of polymer chain branching.

Preferably, the total linear infrared absorbance spectrum integrated peak area within the frequency range 726–930 $cm^{-1}$ is distributed as follows: from 8 to 22%, most preferably from 12 to 20%, of the integrated peak area falls within the frequency range 865–930 $cm^{-1}$; from 20 to 45%, most preferably from 25 to 40%, of the integrated peak area falls within the frequency range 806–864 $cm^{-1}$; from 7 to 20%, most preferably from 10 to 18%, of the integrated peak area falls within the frequency range 778–805 $cm^{-1}$; and the remainder of the integrated peak area within the frequency range 726–930 $cm^{-1}$ falls within the frequency range 726–777 $cm^{-1}$.

Figure 2:
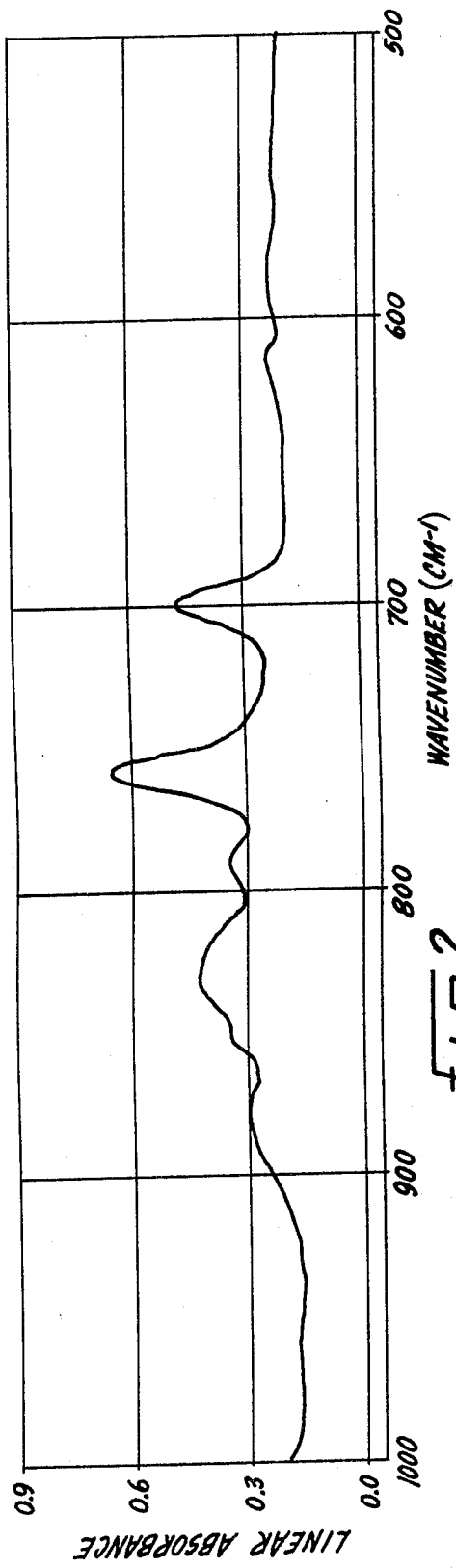
FIG. 2 shows a linear infrared absorbance spectrum (KBr pellet, calibrated in wavenumbers) of the branched nitropolyphenylene described in Example II.

FIG. 2 is a typical linear infrared absorption spectrum for a branched nitropolyphenylene within the scope of this invention. The exact spectrum shown in FIG. 2 was obtained from a KBr pellet containing the nitropolyphenylene described in Example II.

Preferably, the branched nitropolyphenylene has an inherent viscosity of at least 0.04 when measured in trichlorobenzene at 135°C at a concentration of 0.02 g/ml. The number average molecular weights of the nitropolyphenylene range from as low as 1,000 to greater than 10,000, and are preferably greater than about 4,000.

The branched nitropolyphenylene of this invention can be prepared by the nitration of unmodified branched polyphenylenes. The branched polyphenylene starting material should have at least about 8% by weight of its benzene ring structures bonded to three or more other benzene ring structures, that is, it should be at least 8% branched.

The unmodified branched polyphenylene starting material useful in this invention can also be characterized by the relative amounts of the linear infrared absorbance spectrum integrated peak area within the frequency range 726–903 $cm^{-1}$. In general, from about 7 to 18%, preferably 10 to 18%, of the total integrated peak area within the frequency range 726–930 $cm^{-1}$ should fall within the frequency range 854–930 $cm^{-1}$ (I region). The frequency range 806–853 $cm^{-1}$ (P region) generally accounts for about 15 to 30%, preferably 18 to 26%, of the total integrated peak area. The frequency range 778–805 $cm^{-1}$ (M region) accounts for about 13 to 20% of the total integrated peak area.

The branched polyphenylene starting material alternatively can be characterized by the amount of the various types of benzene ring structures present in the polymer chains. This is determined according to the equation:

$$c = (A/b \cdot a^*)$$

In this equation, A is the planimeter area reading for the particular absorption frequency range corrected by a constant factor relating to the planimeter used in the measurement and A is in units of cm$^{-1}$. The values of A for the region between 854 and 930 cm$^{-1}$ are corrected for the presence of meta-disubstituted benzene ring structures by applying a correction factor obtained from the value of A for the region 778–805 cm$^{-1}$. The correction factor is one-third of the A value for the 778–805 cm$^{-1}$ region. The term $b$ is the thickness of the KBr pellet in units of cm. The term $a^*$ is the integrated absorptivity in units of g$^{-1}$ l cm$^{-2}$. The values of $a^*$ are obtained from the integrated peak areas of the reference compounds determined under essentially the same operating conditions used for obtaining the spectra for the polyphenylenes. The term $c$ is the concentration in grams per liter of any of the characteristic benzene ring structures associated with the regions I, P, M and PH. The amount of the various types of benzene ring structures present in the polymer chain is determined by dividing the measured concentration obtained from a particular frequency range by the sum of the concentrations obtained from the group frequency ranges involved. Further details of this procedure are described in U.S. Pat. No. 3,792,099.

By the above described analysis, the amount of benzene ring structures in the branched polyphenylene polymer chains which are at least trisubstituted, that is, bonded to three or more other benzene ring structures, is at least about 8% by weight, preferably 10% by weight and is more preferably from about 12 to about 25 percent by weight. The amount of benzene ring structures which are disubstituted, bonded to two other benzene ring structures through either the para, meta, or ortho positions, is preferably from about 45 to about 65 percent by weight. The amount of benzene ring structures which are meta-disubstituted, bonded through the meta position to two other benzene ring structures, is preferably from about 15 to about 35 percent by weight. The terminology "double bonding through the meta position" refers to the bonding of a benzene ring structure to two other benzene ring structures through the meta positions of the benzene ring structure. The remaining benzene ring structures in the polymer chains are bonded to only one other benzene ring structure.

The inherent viscosity of the branched polyphenylenes can vary from about 0.025 or less to more than 0.17 when measured in trichlorobenzene at 135°C at a concentration of 0.02 g/ml. This roughly corresponds to a number average molecular weight range of from 1,000 or less to greater than 10,000. A number average molecular weight range of about 3,000 to 10,000 is particularly advantageous for the preparation of the nitropolyphenylenes of this invention.

A particularly preferred branched polyphenylene starting material is that prepared from biphenyl by the dehydrogenative coupling process described in U.S. Pat. Nos. 3,855,332, 3,829,518 and 3,798,281.

The branched polyphenylenes can be converted to the branched nitropolyphenylene of this invention by a nitration reaction. A preferred nitration reaction consists of the addition of a mixed nitric acid and sulfuric acid nitrating agent to a solution consisting of the branched polyphenylene, water and sulfuric acid. This reaction is preferably conducted at from 0° to 50°C for from 3 hours to 10 hours, more preferably from about 5° to 15°C for about 2 to 4 hours followed by a few hours at a temperature of about 30° to 50°C.

The branched nitropolyphenylene of this invention has particular utility in a polyphenylene resin mixture which comprises the nitropolyphenylene and the branched polyphenylene described above. A polyphenylene resin mixture containing branched nitropolyphenylene can be used to make carbon fiber, graphite fiber, and glass fiber composites having properties superior to those that can be obtained with the branched polyphenylene resin alone.

In solvent impregnation molding of carbon fiber or graphite fiber composites, the branched polyphenylene resin alone does not provide sufficient bonding strength or interaction for good mechanical properties. In most instances, no composite can be formed as delamination occurs. However, when a resin mixture comprising the branched polyphenylene described above and at least 20% by weight of the nitropolyphenylene of this invention is used in the preparation of carbon fiber and graphite fiber composites, structural integrity and good mechanical properties can be achieved. Preferably, the polyphenylene resin mixture should not contain more than 50 percent by weight of the nitropolyphenylene. More preferably, the polyphenylene resin mixture should contain between 25 and 40 percent by weight of the nitropolyphenylene.

Composites prepared from the polyphenylene resin mixture and either carbon fiber or graphite fiber should contain from 15 to 55 percent by weight of the resin mixture. Preferably, the amount of the polyphenylene resin mixture in the composite should be from 25 to 45 percent by weight.

Graphite and carbon fiber composites can be prepared from the polyphenylene resin mixture as follows: First, an impregnating solution is prepared by dissolving the branched polyphenylene resin and the branched nitropolyphenylene resin into an appropriate solvent, preferably n-methyl pyrrolidone. The resin to solvent ratio is preferably between 15 and 30 parts by weight resin to 100 parts by volume solvent. Lengths of graphite or carbon fibers are then arranged in pairs but oriented 90 degrees to each other. The pairs of fibers are separately coated on one side by brushing on the impregnating solution and are then dried in a vacuum oven at about 100°C to remove the solvent. The pairs of fibers are then coated on the other side and again dried. This process is continued until all of the impregnating solution is used up. The treated fiber pairs are then stacked into an appropriate sized mold for pressing. The molding conditions can range from 650 psi to about 3000 psi at temperatures of from 750° to 1100°F. Preferably, the pressure is from about 900 psi to 2,000 psi and most preferably about 1,000 psi. The preferred molding temperature is between 850° and 1,000°F and most advantageously is about 950°F. Molding times can vary from as little as 10 minutes to more than one hour at the molding temperatures. Preferably, the molding time is about 30 minutes, broken down into 3 segments of about 5 minutes each, followed by 15 minutes at the molding temperature.

Unmodified branched polyphenylenes also do not provide sufficient bonding strength or interaction for formation of composites with glass fibers. But when a resin mixture comprising the branched polyphenylene and at least 20% by weight of the nitropolyphenylene of this invention is used, glass fiber composites having good structural integrity can be formed. Preferably, no more than 50% by weight of the polyphenylene resin mixture is the nitropolyphenylene. More preferably, from 25 to 40 percent by weight of the resin mixture is the branched nitropolyphenylene.

Composites containing the polyphenylene resin mixture and glass fiber can be prepared by dry blending chopped glass fibers, preferably about 1/16 to 3/16 inch long, with a mixture of the polyphenylene resins which have been ball milled to a fine powder. The mixture of resin and fibers is then transferred to a mold for pressing at pressures in the range of 1,000 to 4,000 psi, preferably 2,000 to 3,500 psi. The molding temperature can range from about 750° to over 1,000°F, preferably between 850° and 1,000°F. Pressing times can vary from as little as about 10 minutes to more than one hour. The amount of resin in the glass fiber composites can vary between 15 and 55 percent by weight and is preferably from about 25 to 45 percent by weight.

When used in asbestos fiber composites, especially those made with short chrysotile asbestos fibers, the polyphenylene resin mixture of this invention produces composites which have superior thermal aging stability than composites prepared from relatively low molecular weight branched polyphenylenes alone. Thermal aging studies at 600°F in air show that asbestos composites containing relatively low molecular weight mixed polyphenylene resin of this invention suffer a smaller reduction in flexural strength and flexural modulus than asbestos composites containing the branched polyphenylene resin alone. Generally, suitable composites can be formed from asbestos and unmodified polyphenylene, if the inherent viscosity of such resin (as measured in 1,2,4-trichlorobenzene at room temperature) is between about 0.7 and 0.12. At higher molecular weights mechanical properties after aging with or without nitropolyphenylene usually will be poorer. However, if an unmodified polyphenylene has an inherent viscosity less than about 0.07, addition of nitropolyphenylene to the resin mixture is preferred and such a system will be superior to a composite made from unmodified polyphenylene alone. Using lower molecular weight unmodified resin, the polyphenylene resin mixture should contain between about 5 and 40 percent by weight of the branched nitropolyphenylene of this invention and, preferably, between 10 and 35 percent by weight of the branched nitropolyphenylene. Composites prepared from the polyphenylene resin alone or in mixture with nitropolyphenylene and asbestos fibers should contain from 15 to 55 percent by weight of the resin mixture and, preferably, from 20 to 40 percent by weight. While any type asbestos fiber can be used, chrysotile asbestos is preferred.

Asbestos fiber composites containing the polyphenylene resin mixture of this invention can be prepared either by solvent impregnation or, more preferably, by dry blending. The solvent impregnation technique is similar to that described above for carbon and graphite fibers except that higher pressures are generally required for molding, preferably from 3,000 to 4,000 psi.

A preferred dry blending technique consists of ball milling the polyphenylene resin mixture to reduce the resin to a fine powder and then adding it to the asbestos fibers with high speed mixing. The mixture of resin and fibers is then transferred to a mold for pressing. Molding pressures are usually in the range of 1,000 to 4,000 psi, preferably between 1,500 and 3,500. The molding temperature can range from about 750° to over 1,000°F, but is preferably between about 850°F and 1,000°F. Pressing times at the mold temperature range from about 10 minutes to more than one hour and are preferably about 30 minutes broken down into segments.

Effective amounts of filler materials such as barium sulfate can be included within the resin mixture to alter such composite properties as the coefficient of friction.

EXAMPLE I

Into a stirred reaction container there was charged 5.3 grams of a branched alkyl unsubstituted polyphenylene having an inherent viscosity of 0.04 at 135°C in trichlorobenzene at a concentration of 0.02g/ml and a softening point of about 150°C, 100 milliliters of concentrated sulfuric acid and 20 milliliters of water. To this stirring mixture there was added a mixture of 25 milliliters of nitric acid (sp gr 1.42) and 57 milliliters of concentrated sulfuric acid over a one-hour period at 5° to 10°C. The reaction mixture was then maintained at 5° to 10°C for 2.5 hours followed by 4 hours at 40°C. The reactor contents were then stirred with ice and filtered. The dark solid product was then washed to neutrality with distilled water and dried at 120°C under vacuum.

The nitropolyphenylene product had an inherent viscosity of 0.05 at 135°C in trichlorobenzene at a concentration of 0.02 g/ml, a softening point of about 160°C, and was soluble in n-methylpyrrolidone and dimethyl formamide. Elemental analysis was as follows: N, 12.16%; O, 29.69%; C, 54.4%; and H, 2.25%. Infrared absorbance was observed at 1,345 cm$^{-1}$ and 1525 cm$^{-1}$. NMR analysis showed weak aromatic hydrogens which indicates that the aromatic structure of the starting material was not destroyed.

EXAMPLE II

A branched polyphenylene was prepared and characterized as follows:

Into a stirred one-gallon autoclave there was charged 20 grams of a $MoO_3 \cdot SiO_2 \cdot Al_2O_3$ catalyst, 1,000 grams of biphenyl and 300 psig of hydrogen gas. A constant heat input was then applied. The reaction had reached a temperature of 1,082°F and pressure of 1,750 psig before the reaction was terminated. The total reaction time was 5 hours and 25 minutes.

The total crude polymer was then washed with 1,2,4-trichlorobenzene and pentane to remove the catalyst and low molecular weight components, and was vacuum dryed at 100°C for 24 hours. The product polyphenylene had an inherent viscosity of 0.06 when measured at 135°C in trichlorobenzene at a concentration of 0.02 g/ml using a Cannon-Ubbelohde viscometer. This polymer had a softening point of about 200°C.

Figure 3:
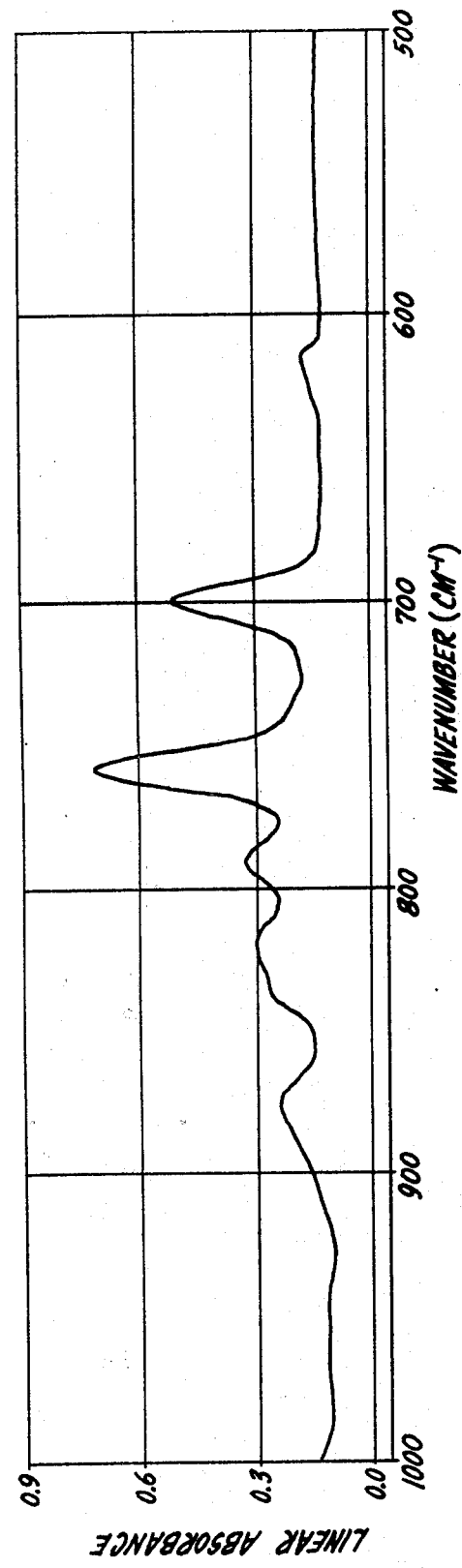
FIG. 3 shows a linear infrared absorbance spectrum (KBr pellet, calibrated in wavenumbers) of the branched polyphenylene described in Example II.

A linear absorbance infrared spectrum was obtained for this polymer on a Perkin-Elmer Model 180 spectrometer from a KBr pellet. This spectrum is shown in FIG. 3. It was obtained as follows: About 7 milligrams of the polyphenylene and about 0.8 grams of dry KBr were accurately weighed and then placed into a clean grinder vial along with a steel grinder ball. The vial was placed on a dental grinder and the sample was ground for 10 minutes and about 0.15 grams was then transferred to the KBr die and the die plunger was inserted. The die was attached to a vacuum line to remove entrapped air and the sample was pressed at 20 tons per square inch for 4 minutes. The concentration of resin in the pressed pellet was 22.62 g/l and the thickness of the pellet was 0.0560 cm. The pellet was mounted in the holder of a Perkin-Elmer Model 180 spectrometer and the sample was scanned from 600 cm$^{-1}$ to 1,000 cm$^{-1}$ on linear absorbance paper.

A base line was drawn from 930 cm$^{-1}$ to 650 cm$^{-1}$. The areas corresponding to the frequency regions indicated in Table I below were measured with a planimeter. The planimeter area readings obtained for these frequency readings are shown in the Table along with the percentage of integrated peak area associated with each region. Using a constant factor of 1/20.75 cm$^{-1}$, determined from the planimeter used, the planimeter area readings were also converted to values of A. These values for A were used to determine the analyzed concentration of the sample according to the equation: $c = (A/b \cdot a^*)$ wherein $c$ is in units of g/l, A is the corrected planimeter reading in cm$^{-1}$, $b$ is the pellet thickness in units of cm, and $a^*$ is in units of g$^{-1}$ l cm$^{-2}$. The analyzed concentration values were then converted to normalized weight percentages.

Into a stirred reaction container there was charged 100 grams of the above prepared polyphenylene, 1,400 milliliters of concentrated sulfuric acid and 280 milliliters of water. To this mixture was added over a one-hour period at 5° to 10°C with stirring, a mixture of 57 milliliters of concentrated sulfuric acid and 25 milliliters of nitric acid (sp. gr. = 1.42). The reaction mixture was then maintained at 5° to 10°C for an additional 3 hours and at 40°C for 4 hours. The reactor contents were then stirred with ice and filtered. The dark solid product was then washed to neutrality with distilled water and dried at 120°C under vacuum.

This nitropolyphenylene had a softening point of greater than 300°C and was only partially soluble in trichlorobenzene and n-methylpyrrolidone. Elemental analysis was: N, 2.3%; O, 8.5%; C, 82.2%; and H, 3.8%.

FIG. 1 is an infrared absorbance spectrum for this nitropolyphenylene obtained on a Perkin-Elmer Model 180 spectrometer from a KBr pellet prepared according to the procedure described above. Infrared absor- Table I

| Frequency Region (cm$^{-1}$) | Region | Planimeter Area (cm$^2$) | Percent Integrated Area | A/b (cm$^{-2}$) | c (g/l) | Normalized Weight Percent |
|---|---|---|---|---|---|---|
| 854–930 | I | 99 | 16.1 | | | |
| 854–930 | I | (1) 65.2 | | 56.18 | 4.31 | 17.9 |
| 806–853 | P | 143.5 | 23.4 | 123.65 | 7.21 | 29.9 |
| 778–805 | M | 101.5 | 16.5 | 87.46 | 6.80 | 28.2 |
| 726–777 | PH | 269 | 43.9 | 213.78 | 5.76 | 23.9 |

(1) The value for the planimeter area for the I frequency region has been corrected for the presence of M region material, i.e., meta-disubstituted benzene ring structures. The correction factor is equal to one-third of the planimeter area for the region M.

The values for $a^*$ are indicated in Table II. These values were determined from the linear absorbance spectra of m-terphenyl, m-quaterphenyl, m-quinquiphenyl, o-terphenyl, and p-terphenyl. The same conditions as described above including the same planimeter, were used to prepare the linear absorbance spectra for these reference compounds. The value for $a^*$ was obtained from the integrated absorptivity per mole of hydrogen by multiplying it by the number of hydrogen atoms present in the characteristic benzene ring structure and dividing it by the molecular weight of the characteristic structure. The characteristic structure for the I region was assumed to be a trisubstituted benzene ring in which the substituted carbon atoms have a meta relationship to one another.

Table II

| Region | Absorption Frequency (cm$^{-1}$) | Characteristic No. of H Atoms | Integrated Absorptivity per mole of H (mole$^{-1}$/l cm$^{-2}$) | $a^*$ (g$^{-1}$ l cm$^{-2}$) |
|---|---|---|---|---|
| PH | 726–777 | 5 | 620.5 | 40.27 |
| M | 778–805 | 3 | 326.0 | 12.86 |
| P | 806–855 | 2 | 326.0 | 17.15 |
| I | 854–930 | 1 | 326.0 | 13.04 |

The sum of the values for $c$ is 24.08 g/l. The weight percent of each of the characteristic structures present was determined by dividing the value of c for each region by the sum of the values for $c$. The percent recovery for the analysis was determined by dividing the sum of the values for $c$ by the known sample concentration. The percent recovery was 106.5%.

A nitropolyphenylene obtained from the above polyphenylene was prepared and characterized as follows:

bance spectrum was also obtained from the same KBr pellet and is shown in FIG. 2. The concentration of the KBr pellet was 23.38 g/l and its thickness was 0.0561 cm. The planimeter integrated peak areas in normalized weight percents attributable to each of the characteristic structures were obtained as described above and are shown in Table III. The percent recovery was 115.3%.

Table III

| Frequency Region (cm$^{-1}$) | | Region | Planimeter Area (cm$^2$) | Percent Integrated Area |
|---|---|---|---|---|
| 865–930 | (1) | I | 101 | 15.5 |
| 806–864 | (1) | P | 234 | 36. |
| 778–805 | | M | 80 | 12.3 |
| 726–777 | | PH | 235 | 36.1 |

(1) Note that the I and P regions frequency ranges indicated in this Table for the nitropolyphenylene are slightly different from those indicated in Tables I and II for the branched unmodified polyphenylene. This is due to a frequency shift caused by the presence in the P region of benzene ring structure having two adjacent aromatic hydrogens and nitro substitutions and, primarily, polymer chain phenyl and metadisubstituted benzene ring structures with nitro group substitutions.

EXAMPLE III

A branched polyphenylene was prepared as follows: In a manner similar to Example II, there was charged 20 grams of a $MoO_3 \cdot SiO_2 \cdot Al_2O_3$ catalyst, 1000 grams of biphenyl and 300 psig of hydrogen gas. Constant heat input conditions were applied. The maximum temperature reached during the six and one-fourth hour reaction was 1049°F and the maximum pressure was 1,485 psig. The worked up polymer had an inherent viscosity of 0.03 at 135°C in trichlorobenzene at 0.02 g/ml. The softening point was about 150°C.

A KBr pellet according to the procedure described in Example II had a concentration of 25.83 g/l and produced a linear absorbance spectrum which had the planimeter integrated areas indicated in Table IV. The pellet thickness was 0.0495 cm.

Table IV

| | Region | Planimeter Area ($cm^2$) | Integrated Area (%) |
|---|---|---|---|
| I | (854–930 $cm^{-1}$) | 70 | 11.8 |
| P | (806–853 $cm^{-1}$) | 118 | 19.8 |
| M | | 96.5 | 16.2 |
| PH | | 311 | 52.2 |

A nitropolyphenylene was prepared from the above described polyphenylene as follows: Into a stirred reaction container there was charged 50 grams of the above prepared polyphenylene, 700 milliliters of concentrated sulfuric acid and 140 milliliters of water. To this was added a mixture of 9.8 milliliters of concentrated sulfuric acid and 4.2 milliliters of nitric acid (sp. gr. = 1.42) over a one-hour period at 5° to 10°C with stirring. The reaction mixture was maintained for an additional 3 hours at 5° to 10°C and for 4 more hours at 40°C. The dark solid product was washed to neutrality with distilled water and dried at 120°. under vacuum. This nitropolyphenylene had a softening point of about 185°C. Its inherent viscosity was 0.05 at 135°C in trichlorobenzene at 0.02 g/l ml. Elemental analysis was: N, 0.93%; O, 2.33%; C, 91.79%; and H, 4.88%. Infrared absorbance was observed at 1345 $cm^{-1}$ and 1525 $cm^{-1}$.

A linear absorbance spectrum was obtained from a KBr pellet prepared according to the procedure described in Example II. The KBr pellet resin concentration was 24.80 g/l and thickness was 0.0496 cm. The planimeter integrated peak areas and percent of the integrated peak area associated with each region is shown in Table V.

Table V

| | Region | Planimeter Area ($cm^2$) | Integrated Area (%) |
|---|---|---|---|
| I | (865–930 $cm^{-1}$) | 60.9 | 12.6 |
| P | (806–864 $cm^{-1}$) | 115 | 23.7 |
| M | | 74 | 15.3 |
| PH | | 235 | 48.4 |

EXAMPLE IV

A branched polyphenylene was prepared as follows: In a manner similar to Example II, there was charged 20 grams of a catalyst, 1,000 grams of biphenyl and 300 psig of hydrogen gas. Constant heat input was then applied. The maximum temperature was 1,023°F and the maximum pressure 1550 psig. The total reaction time was 7 hours and 15 minutes. The final worked-up polymer had an inherent viscosity of 0.05 at 135°C in trichlorobenzene at 0.02 g/ml. The softening point was about 180°C.

The KBr pellet prepared according to the procedure described in Example II had a concentration of 26.83 g/l and a thickness of 0.0536 cm. The pellet was scanned on a Perkin-Elmer Model 180 infrared spectrometer which produced a linear infrared absorbance spectrum from which were obtained the planimeter areas shown in Table VI below. The percentage of the integrated peak area within the frequency range 726–930 $cm^{-1}$ falling within the four regions is also shown.

Table VI

| | Region | Integrated Area ($cm^2$) | Integrated Area (%) |
|---|---|---|---|
| I | (854–930 $cm^{-1}$) | 98 | 3.6 |
| P | (806–853 $cm^{-1}$) | 167 | 23.2 |
| M | | 129 | 17.9 |
| PH | | 325 | 45.2 |

A nitropolyphenylene was prepared from the above described polyphenylene as follows: Into a stirred reaction container there was charged 100 grams of the polyphenylene, 1,400 milliliters of concentrated sulfuric acid and 140 milliliters of water. To this stirred mixture there was added a mixture of 114 milliliters concentrated sulfuric acid and 50 milliliters of nitric acid over a one-hour period at 5° to 10°C. The reaction mixture was then maintained at 5° to 10°C for three additional hours before the temperature was raised to about 40°C for four hours. The worked up product had a softening point of about 280°C and was not completely soluble in either trichlorobenzene or n-methylpyrrolidone. Elemental analysis was: N, 3.5%; O, 13.6%; C, 75.5%; and H, 3.9%. Infrared absorbance was observed at 1,345 $cm^{-1}$ and 1,525 $cm^{-1}$.

A linear absorbance spectrum was obtained from a KBr pellet prepared according to Example II. The KBr pellet concentration was 26.83 g/l and the thickness was 0.0491 cm. The planimeter integrated peak areas Table VII

| Region | Planimeter Area (cm²) | Integrated Area (%) |
|---|---|---|
| I (865–930 cm⁻¹) | 82 | 16.0 |
| P (806–864 cm⁻¹) | 192 | 37.4 |
| M | 62.5 | 12.2 |
| PH | 177 | 34.5 |

EXAMPLE V

In this Example a 20 ply, 3 × 3 × ⅛ inch composite was prepared by solvent impregnation from graphite fiber and a mixture of a branched nitropolyphenylene within the scope of this invention and an unmodified branched polyphenylene. First, an impregnating solution was prepared by dissolving the polyphenylene resins in n-methylpyrrolidone. Into 57 milliliters of n-methylpyrrolidone, there was dissolved 10 grams of an unmodified polyphenylene similar to that prepared in Example II having an inherent viscosity of 0.08 at room temperature in trichlorobenzene at 0.02 g/ml (a number average molecular weight of approximately 5,000) and 4.3 grams of a nitropolyphenylene very similar to that prepared in Example II having a nitrogen content of about 2.3% and a softening point of about 300°C.

Twenty 3-inch lengths of Celanese graphite tape (CELION GY-70, treated surface, 3-inch width) were arranged in pairs oriented 90 degrees to each other. Each pair of fiber was coated on one side by brushing with the impregnating solution. The brushing was followed by drying in a vacuum oven at 100°C to remove the solvent. Each pair of fiber was then coated on the other side and the drying repeated. This was continued until all of the impregnating solution was consumed. The coated fibers were stacked in a 3 × 3 inch mold for pressing in a well-ventilated press. After the mold containing the prepreg was placed on the platen heated to 950°F, 1000 psig pressure was applied and quickly released to remove air from the prepreg. The pressure was reapplied and released 3 times at 5-minute intervals during which time gas was evolved. The pressure then was applied for an additional 15 minutes at 950°F. Pressing was complete after 30 minutes at 950°F. The composite was cooled to 100°F while maintaining the pressure and then ejected from the mold. The pressed composite contained 40.5% resin and had a flexural strength of 7,834 psi and a flexural modulus of 2,268,000 psi.

Comparative Example VI

In a manner similar to that described in Example V, unsuccessful attempts were made to make composites from the same type graphite fiber and unmodified branched polyphenylenes.

A. One unmodified branched polyphenylene which had an inherent viscosity of 0.08 at room temperature was prepared for molding and molded under the same procedure described in Example V. The resin content was 32%, but no composite, i.e., the molded product had no structural integrity and easily delaminated.

B. A sample of the same polyphenylene as in A above was prepared for molding and molded under the same conditions as in A except that the molding pressure was 2,000 pis instead of 1,000 psi. The resin content was also 32%, but no composite was formed.

C. An attempt was made to form a composite from a sample of the unmodified branched polyphenylene which was used in Example V at a resin content of 42.7;1 % under the same conditions used in Example V, however, a composite was not formed.

EXAMPLE VII

In a manner similar to that described in Examples V and VI, two attempts were made to make composites from the same type graphite fiber and a resin mixture of 10% branched nitropolyphenylene and 90% unmodified branched polyphenylene. At a 35% resin content and under the same molding conditions described in Example V, no composites could be formed. In one case, a sample of the same unmodified branched polyphenylene used in Example V was used (12.9 g) along with 1.4 grams of a branched nitropolyphenylene having a nitrogen content of 1.27% and a softening point of 250°C. In the other case, the branched nitropolyphenylene (1.4 g) had a nitrogen content of 2.67% and a softening point of 300°C. The unmodified branched polyphenylene (12.9 g) used in this experiment also had a room temperature inherent viscosity of 0.08.

EXAMPLE VIII

Again, in a manner similar to that described in Examples V-VII, an attempt was made to form a graphite fiber composite from a mixture of about 70% of an unmodified branched polyphenylene and about 30% of a branched nitropolyphenylene within the scope of this invention. The unmodified polyphenylene (13.5 g) had a room temperature inherent viscosity of 0.08. The nitropolyphenylene (5.7 g) had a nitrogen content of about 2.3% and a room temperature inherent viscosity of 0.09. The amount of n-methylpyrrolidone used was 77 milliliters. The total resin content was 40.5%. A good compsite was formed having a flexural strength of 9,886 psi and a flexural modulus of 2,873,000 psi.

EXAMPLE IX

Composites containing asbestos fiber can be made from a resin mixture containing the branched nitropolyphenylene of this invention and unmodified branched polyphenylenes as follows: A dry blend of polyphenylene resin mixture and random asbestos short fibers was made in the following manner. The asbestos fiber was fluffed in a Waring blender for 10 minutes at high speed. The polyphenylene resin mixture, which had been ball milled so that 100% passed through a 60 mesh screen, was added to the blender and mixed for another 10 minutes. The resin-fiber mixture was compacted into a 7 × 7 inch mold for pressing. Using a well-ventilated press with its platen temperature at 950°F, the mold was inserted and 3200 psi pressure was applied and quickly released to remove air from the prepreg. Pressure was reapplied and released three times at 5-minute intervals. Total pressing time at 950°F was 30 minutes. The composite was cooled to 100°F in the mold while the pressure was maintained. An approximately 7 × 7 × ⅛ inch composite then was ejected from the mold.

A. Using a polyphenylene resin mixture containing 24% of the nitropolyphenylene prepared in Example IV and 76% of an unmodified branched polyphenylene having an inherent viscosity of 0.06 at room temperature in trichlorobenzene at a concentration of 0.02 g/ml, a composite having a 38.7% resin content was prepared according to the above procedure with short chrysotile asbestos. Its flexural strength (F.S.) was 9,400 psi and its flexural modulus (F.M) was 1,819,000

Example IX B. Both the nitropolyphenylene and the polyphenylene were ball milled prior to being mixed with the glass fiber. This mixture was placed in a 3 × 3 inch mold and was pressed at 950°F for 30 minutes at 3200 psi. Pressure was briefly released shortly after starting and also after 5, 10 and 15 minutes. The composite had good structural integrity. The resin content of the composite was 33.4%.

In a similar manner, 25.8 g of branched polyphenylene having an inherent viscosity of 0.07 at room temperature in trichlorobenzene was mixed with ⅛ inch glass fiber. This mixture was pressed under the same conditions as above but a composite was not formed.

TABLE VIII

| Ex. | Asbestos (%) | Branched Poly-Phenylene (%) | Inherent Viscosity of Poly-Phenylene(1) | Molding Conditions | | | Flexural Strength (psi) | | | Flexural Modulus (psi) | | |
|---|---|---|---|---|---|---|---|---|---|---|---|---|
| | | | | Temp. (°F.) | Pressure (psi) | Total Time (Mins.) | Initial | Final(2) | Change (%) | Initial | Final(2) | Change (%) |
| X | 56.8 | 43.2 | 0.10 | 950 | 1600 | 10 | 7,600 | 8,800 | +15.8 | 1,384,000 | 1,100,000 | −20.5 |
| XI | 67.8 | 32.2 | 0.07 | 600 | 1000 | 30 | 10,100 | 9,400 | −6.9 | 1,734,000 | 1,395,000 | −19.6 |
| XII (3) | 50 | 40 | 0.07 | 950 | 3200 | 10 | 8,400 | 9,200 | +9.5 | 1,269,000 | 1,276,000 | +0.06 |
| XIII (3) | 50 | 40 | 0.08 | 950 | 3200 | 10 | 8,500 | 9,200 | +8.2 | 523,000 | 994,000 | +90 |
| XIV (3) | 50 | 40 | 0.07 | 950 | 3200 | 10 | 8,800 | 8,300 | −5.7 | 981,000 | 1,050,000 | +7 |

(1) In 1,2,4-trichlorobenzene at room temperature
(2) Final measurement taken after plaques were aged at 600°F for 336 hours in air.
(3) Includes 10 wt% barium sulfate psi. After this composite was aged at 600°F in air for 14 days its flexural strength had dropped to 8,900 psi and its flexural modulus had dropped to 1,235,000 psi. These values are 94% and 68%, respectively, of the original strengths.

B. An asbestos composite containing 37.5% resin was also prepared according to the above procedure from an unmodified branched polyphenylene having a room temperature inherent viscosity of 0.16 in trichlorobenzene and chrysotile asbestos. The F.S. was 7,900 psi and the F.M. was 1,570,000 psi. After 14 days at 600°F in air, the F.S. had dropped to 3,100 psi while the F.M. had dropped to 493,000 psi. These values are 39 and 31%, respectively, of the original values.

C. An asbestos composite containing 32.2% resin and chrysotile asbestos was prepared in a similar manner but at 850°F and 1000 psi from the same unmodified branched polyphenylene used in A above. As in B, no nitropolyphenylene was used The F.S. was 8,300 psi and the F.M. was 1,936,000 psi. After 14 days in air at 600°F the F.S. dropped to 6,800 psi while the F.M. dropped to 1,122,000 psi. The post-aging strengths were 82% and 58%, respectively, of their original values.

EXAMPLES X-XIV

Using a method similar to that described in Example IX, composites were formed from chrysotile asbestos (70-1 grade) and unmodified branched polyphenylene resin by dry-blending resin and asbestos and then forming 3 × 3 × ⅛ inch plaques. Other composites were prepared including 10 wt.% barium sulfate. Mechanical properties were tested before and after aging each plaque at 600°F for 336 hours in air. The results are shown in Table VIII.

EXAMPLE XV

Chopped glass fibers, about ⅛ inch in length, were placed into a blender along with 4 grams of the branched nitropolyphenylene prepared in Example IV and 8.6 grams of the branched polyphenylene used in

I claim:
1. A branched nitropolyphenylene comprising benzene ring structures bonded into a polymer chain and from 0.25 to 15 percent by weight of nitrogen wherein infrared absorbance occurs at frequencies of about 1,345 cm$^{-1}$ and about 1,525 cm$^{-1}$ and at least 8% of the linear infrared absorbance spectrum integrated peak area within the frequency range 726–930 cm$^{-1}$ is within the frequency range 865–930 cm$^{-1}$.

2. The nitropolyphenylene of claim 1 wherein the linear infrared absorbance spectrum integrated peak area within the frequency range 726–930 cm$^{-1}$ is distributed as follows: from 8 to 22% of the integrated peak area is within the frequency range 865–930 cm$^{-1}$, from 20 to 45% is within the frequency range 806–864 cm$^{-1}$, from 7 to 20% is within the frequency range 778–805 cm$^{-1}$, and the remainder of the integrated peak area within the frequency range 726–930 cm$^{-1}$ is within the frequency range 726–777 cm$^{-1}$.

3. The nitropolyphenylene of claim 2 wherein from 0.50 to 5.0 percent by weight of the nitropolyphenylene is nitrogen.

4. The nitropolyphenylene of claim 1 wherein the linear infrared absorbance spectrum integrated peak area within the frequency range 726–930 cm$^{-1}$ is distributed as follows: from 12 to 20% of the integrated peak area within the frequency range 865–930 cm$^{-1}$, from 25 to 40% is within the frequency range 806–864 cm$^{-1}$, from 10 to 18% is within the frequency range 778–805 cm$^{-1}$, and the remainder of the integrated peak area within the frequency range 726–930 cm$^{-1}$ is within the frequency range 726–777 cm$^{-1}$.

5. The nitropolyphenylene of claim 4 wherein from 0.50 to 5.0 percent by weight of the nitropolyphenylene is nitrogen.

6. A resin mixture comprising (a) a branched polyphenylene comprising benzene ring structures bonded into a polymer chain wherein at least 7% of the linear infrared absorbance spectrum integrated peak area within the frequency range 726–930 cm$^{-1}$ is within the frequency range 854–930 cm$^{-1}$ and (b) from 5 to 50% by weight of the nitropolyphenylene of claim 1.

7. The resin mixture of claim 6 wherein from 25 to 40% by weight of the mixture is the nitropolyphenylene.

8. A resin mixture comprising (a) a branched polyphenylene comprising benzene ring structures bonded into a polymer chain wherein the linear infrared absorbance spectrum integrated peak area within the frequency range 720–930 cm$^{-1}$ is distributed as follows: from 10 to 18% of the integrated peak area is within the frequency range 854–930 cm$^{-1}$, from 15 to 30% is within the frequency range 806–853 cm$^{-1}$, from 13 to 20% is within the frequency range 778–805 cm$^{-1}$, and the remainder of the integrated peak area within the frequency range 726–930 cm$^{-1}$ is within the frequency range 726–777 cm$^{-1}$; and (b) from 5 to 50% by weight of the nitropolyphenylene of claim 2.

9. The resin mixture of claim 8 wherein from 0.50 to 5.0 percent by weight of the nitropolyphenylene is nitrogen.

10. The resin mixture of claim 8 wherein from 25 to 40% by weight of the mixture is the nitropolyphenylene.

11. A high temperature resistant composite comprising a fiber selected from the group consisting of glass, graphite and carbon and from 15 to 55 percent by weight of the resin mixture of claim 6.

12. A high temperature resistant composite comprising a fiber selected from the group consisting of glass, graphite and carbon and from 15 to 55 percent by weight of the resin mixture of claim 8.

13. A high temperature resistant composite comprising asbestos fiber and from 15 to 55 wt.% of a resin mixture comprising (a) a branched polyphenylene comprising benzene ring structures bonded onto a polymer chain where at least 7% of the linear infrared absorbance spectrum integrated peak area with the frequency range 726–930 cm$^{-1}$ is within the frequency range 854–930 cm$^{-1}$ and (b) from 0 to 50 wt.% of the nitropolyphenylene of claim 1.

14. The composite of claim 13 wherein the resin mixture contains a branched polyphenylene having an inherent viscosity between about 0.7 and 0.12 and less than 5 wt.% nitropolyphenylene.

15. The composite of claim 13 wherein the resin mixture contains a branched polyphenylene having an inherent viscosity less than about 0.7 and 5 to 50 wt.% nitropolyphenylene.

16. A high temperature resistant composite comprising asbestos fiber and from 15 to 55% of a resin mixture comprising (a) a branched polyphenylene comprising benzene ring structures bonded into a polymer chain wherein the linear infrared absorbance spectrum integrated peak area within the frequency range 726–930 cm$^{-1}$ is distributed as follows: from 10 to 18% of the integrated peak area is within the frequency range 854–930 cm$^{-1}$, from 15 to 30% is within the frequency range 806–853 cm$^{-1}$, from 13 to 20% is within the frequency range 778–806 cm$^{-1}$, and the remainder of the integrated peak area within the frequency range 726–930 cm$^{-1}$ is within the frequency range 726–777 cm$^{-1}$ and (b) from 0 to 50 wt.% of the nitropolyphenylene of claim 2.

17. The composite of claim 16 wherein the resin mixture contains a branched polyphenylene having an inherent viscosity between about 0.7 and 0.12 and less than 5 wt.% nitropolyphenylene.

18. The composite of claim 16 wherein the resin mixture contains a branched polyphenylene having an inherent viscosity less than about 0.7 and 5 to 50 wt.% nitropolyphenylene.

19. The composite of claim 13 containing about 5 to 15 wt.% barium sulfate.

20. The composite of claim 16 containing about 5 to 15 wt.% barium sulfate.

* * * * *

UNITED STATES PATENT OFFICE
CERTIFICATE OF CORRECTION

Patent No. 3,974,121　　　　　　Dated August 10, 1976

Inventor(s) Chen-Shen Wang

It is certified that error appears in the above-identified patent and that said Letters Patent are hereby corrected as shown below:

Title Page　Title　"COMPOSITIONS" should be -- COMPOSITES

Column 11, line 13　"A KBr pellet according" should be -- A KBr pellet prepared according "　12　1st line　"3.6" should be -- 13.6
　　　3rd col. Table VI "　14　line 1　"2,000 pis" should be -- 2,000 psi "　14　"　15　"42.7;1%" should be -- 42.7%

"　16　"　55　"peak area within" should be -- peak area is within

"　18　"　22　"778-806 $cm^{-1}$" should be -- 778-805 $cm^{-1}$

*Signed and Sealed this*

Second *Day of* November 1976

[SEAL]

Attest:

RUTH C. MASON　　　　　　C. MARSHALL DANN
*Attesting Officer*　　　　*Commissioner of Patents and Trademarks*